United States Patent [19]

Crawford et al.

[11] Patent Number: 4,984,478
[45] Date of Patent: Jan. 15, 1991

[54] GEAR DRIVE UNIT WITH EQUALIZED SHIFT

[75] Inventors: Paul A. Crawford; James E. Hall, both of Mt. Vernon, Ohio

[73] Assignee: Dana Corporation, Toledo, Ohio

[21] Appl. No.: 387,655

[22] Filed: Jul. 31, 1989

[51] Int. Cl.$^5$ ............................................. F16H 3/08
[52] U.S. Cl. ................................................... 74/372
[58] Field of Search .......................... 74/369, 371, 372

[56] References Cited

U.S. PATENT DOCUMENTS

| | | | |
|---|---|---|---|
| 1,770,290 | 7/1930 | Wise | 74/372 X |
| 1,872,862 | 8/1932 | Wise | 74/372 X |
| 2,045,835 | 6/1936 | Coen | 74/372 X |
| 4,702,119 | 10/1987 | Edwards | 74/372 X |

*Primary Examiner*—Dirk Wright

*Attorney, Agent, or Firm*—Allen D. Gutchess, Jr.

[57] ABSTRACT

A gear drive unit with an equalized shift is set forth. The gear drive unit is specifically a two-shaft transaxle having multiple forward speeds and at least one reverse speed. The transaxle specifically utilizes an existing transaxle housing originally designed to provide even more forward speeds. Certain existing internal components are also utilized. With the transaxle having fewer forward speeds, the forward speed gears are spaced farther apart on a shaft in the existing housing. To provide an equalized, in-line shift pattern, a shift coupling is employed between certain forward speed gears. The shift coupling connects one of the gears to the shaft when the coupling itself is engaged by a shift key of shift mechanism in the transaxle. Shifting through all gears is thereby accomplished by equal incremental movements of the shift mechanism of the transaxle.

13 Claims, 2 Drawing Sheets

GEAR DRIVE UNIT WITH EQUALIZED SHIFT

This invention relates to a gear drive unit with an equalized shift.

A transaxle embodying the invention usually employs only two parallel shafts, thereby reducing the costs of the unit. A plurality of first forward speed gears and a first reverse gear are individually rotatably mounted on a first shaft within a transaxle housing, with the gears having bores with recesses. A shift member is rotatable with the first shaft and is selectively engageable with the recesses to cause the individual gears to be selectively individually rotated with the first shaft. The recesses have ramps, or washers are located between the gears, to force the shift key toward a retracted position when the key moves from one gear to another, in order to prevent two gears from being engaged at the same time. Further, the reverse gear has a wide smooth bore next to its recesses or a neutral collar is located nest to the reverse gear to serve as a neutral position for the shift key.

A plurality of second forward speed gears and a second reverse gear are supported on a second or output shaft of the transaxle. The second forward speed gears mesh with the first forward speed gears and the second reverse gear is connected through an intermediate idler gear with the first reverse gear. All of the second forward speed gears rotate together through a wide gear or splined shaft on which they are affixed. The wide gear extends beyond the second forward speed gears and constitutes a second reverse gear, a second forward speed gear, and a splined shaft which rotatably connects together the other second forward speed gears.

The transaxle housing, in a preferred form, is die cast with a lower housing part and an upper housing part which meet along a mating or parting line in a plane extending through the first and second shafts of the transaxle. The upper housing part also is formed to receive a bushing carrying a drive or input shaft for the transaxle and a bore to receive a shift shaft. The housing is rather complicated to achieve a multiple number of functions and necessarily involves high die costs and high initial production costs. Heretofore, when fewer forward speeds for a transaxle have been required by EOM customers, this has resulted in a substantial redesign of the transaxle including redesigned transaxle housing and internal components.

The present invention provides a transaxle with fewer forward speeds which utilizes an existing transaxle housing and certain existing internal components of a transaxle having additional forward speeds. This results in significantly lower production costs than if the transaxle had to be completely redesigned. Certain gears in the transaxle must be placed in predetermined positions due to physical limitations and the characteristics of the transaxle housing. Consequently, fewer forward speed gears must be placed in a given space in the housing which initially accommodated additional forward speed gears. To provide an equalized shift pattern for the transaxle, the gears are arranged with a shift coupling between certain ones so that the shift mechanism is moved in equal increments in all instances, as the transaxle is shifted between reverse, neutral, and the forward speeds. The equalized shift pattern also enables the use of an existing index and shift plate, shift keys, and certain gears utilized with the existing transaxle having the additional multiple forward speed conditions.

It is, therefore, a principal object of the invention to provide a gear drive unit with an equalized shift pattern.

Many other object and advantages of the invention will be apparent from the following detailed description of a preferred embodiment thereof, reference being made to the accompanying drawings, in which.

Figure 1:
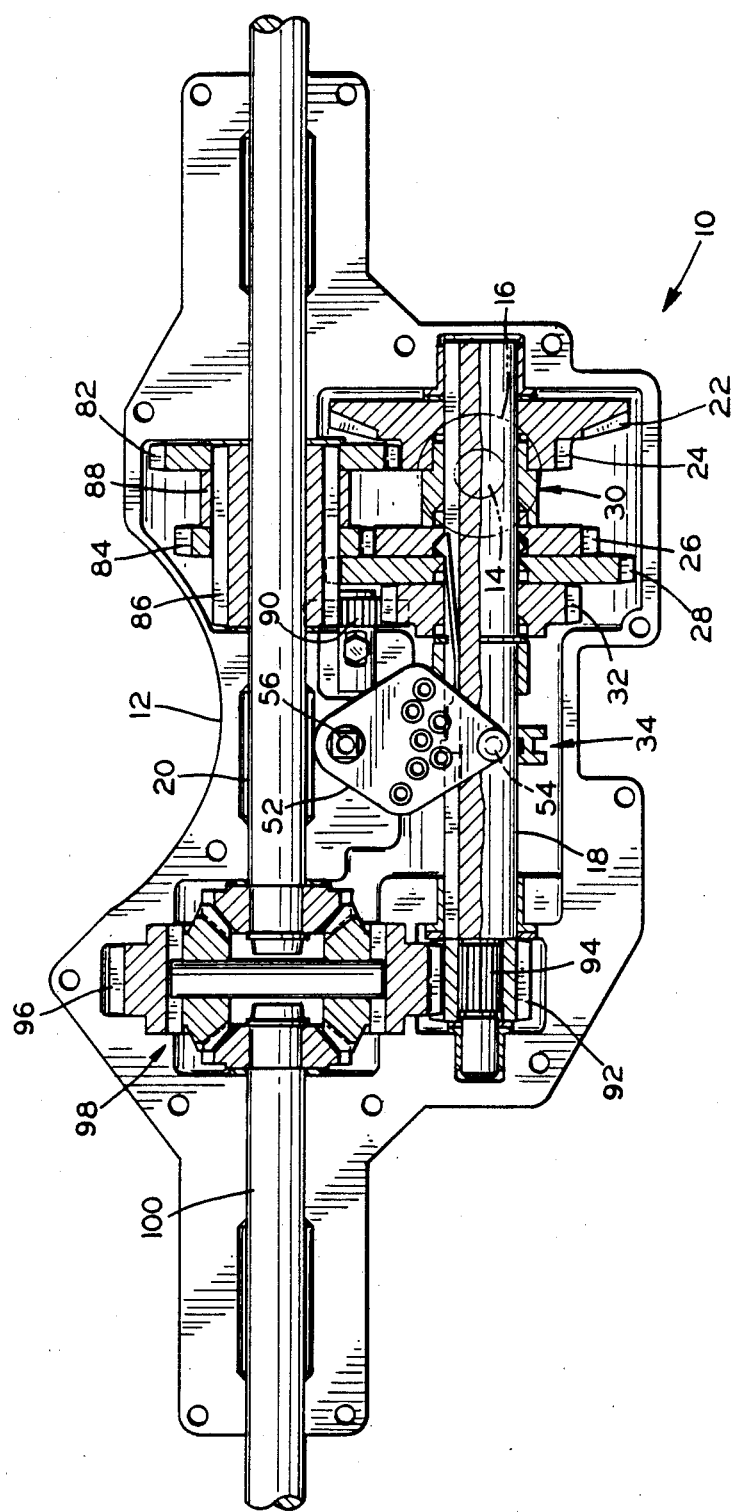
FIG. 1 is a somewhat schematic view in horizontal cross section of a transaxle embodying the invention, with an upper housing part removed.

Referring particularly to FIG. 1, a gear drive unit or transaxle 10 embodying the invention includes a housing 12, only a lower part or half of which is shown, the upper part being removed. The transaxle has an input shaft 14 and a drive bevel gear 16, both shown in dotted lines. The input shaft 14 extends through a bushing in the upper part of the housing 12 and can be driven by any suitable means. The transaxle also has a first or intermediate shaft 18 and a second or output shaft or axle 20.

A combination driven bevel gear 22 is rotatably supported on the shaft 18 and is driven by the drive bevel gear 16. A first, forward speed gear or toothed member 24 is structurally-integral and rotates with the driven bevel gear 22. Additional first, forward speed gears or toothed members 26 and 28 are also rotatably supported on the shaft 18. The gears 26 and 28 are in contiguous relationship and are spaced from the gear 24 by a shift coupling 30 embodying the invention, to be discussed in more detail subsequently. A first reverse gear or toothed member 32 is adjacent the forward speed gear 28 and is also rotatably supported on the shaft 18.

The first forward speed gears 24, 26, and 28 are selectively individually rotated with the shaft 18 by shift mechanism generally indicated at 34. The shift mechanism includes a pair of diametrically-opposite shift or draw keys 36 (FIG. 2) which are slidably mounted in diametrically-opposite longitudinal grooves 38 in the shaft 18. Each of the shift keys 36 has a shank 40 with a lug 42 at one end and a projection 44 at the other end. The shift key shank 40 is resilient and urges the lug 42 outwardly, as is well known in the art. The projection 44 is received in an inner annular groove 46 of a shift collar 48 which also has an outer annular groove 50.

The shift keys 36 are moved longitudinally of the shaft 18 through the shift collar 48 by a detent or shift plate 52 (FIG. 1) located above the collar and having a downwardly-extending projection 54 which is received in the outer groove 50. The detent plate 52 is affixed to a shift shaft 56 which extends through a bore in the upper part of the housing 12 and is rotatably supported thereby. The shaft 56 is connected to a suitable shift arm or lever above the transaxle, which lever is turned to turn the detent plate 52 to move the collar 48 along the shaft 18. The detent plate 52 can be identical to that shown and described in U.S. patent application Ser. No. 386,515, filed on July 27, 1989, that application showing a five forward speed transaxle.

When each of the shift keys 36 is moved longitudinally of the shaft 18, the lug 42 selectively engages recesses or notches 58 in bores 60 of the gears 26, 28, and 32 to individually connect them with the shaft 18 so as to rotate therewith. The bore 60 of each of the gears has four of the recesses 58 which are the same size and shape and are uniformly positioned around the bore, at ninety degree angles from one another. Each of the recesses 58 has a ramp 62 extending angularly upwardly toward common faces of the gears, preferably at an angle of forty to fifty degrees. The reverse gear 32 also has the recesses 58 with the ramps 62. However, the reverse gear 32 is thicker, having a longer bore 64 which constitutes a neutral position for the shift key 36 and specifically for the lug 42 thereof, between reverse and the first forward speed. However, washers between the gears could be substituted for the ramps 62, and a separate neutral collar could be employed in place of the thicker reverse gear.

The combination gear 22 has four conventional recesses or notches 66 (FIGS. 2 and 3) formed therein at ninety degree angles and spaced uniformly around a bore 68 therein. These receive lugs or tangs 70 extending axially from one end of the shift coupling 30 to provide a constant mechanical engagement between the combination gear 22 nd the coupling 30. The shift coupling 30 also has four notches or recesses 72 in the opposite end, which recesses face toward the forward speed gear 26 and are uniformly spaced around a bore 74 in the coupling. The recesses 72 can be similar to the recesses 58, with or without ramps at the inner ends.

Figure 2:
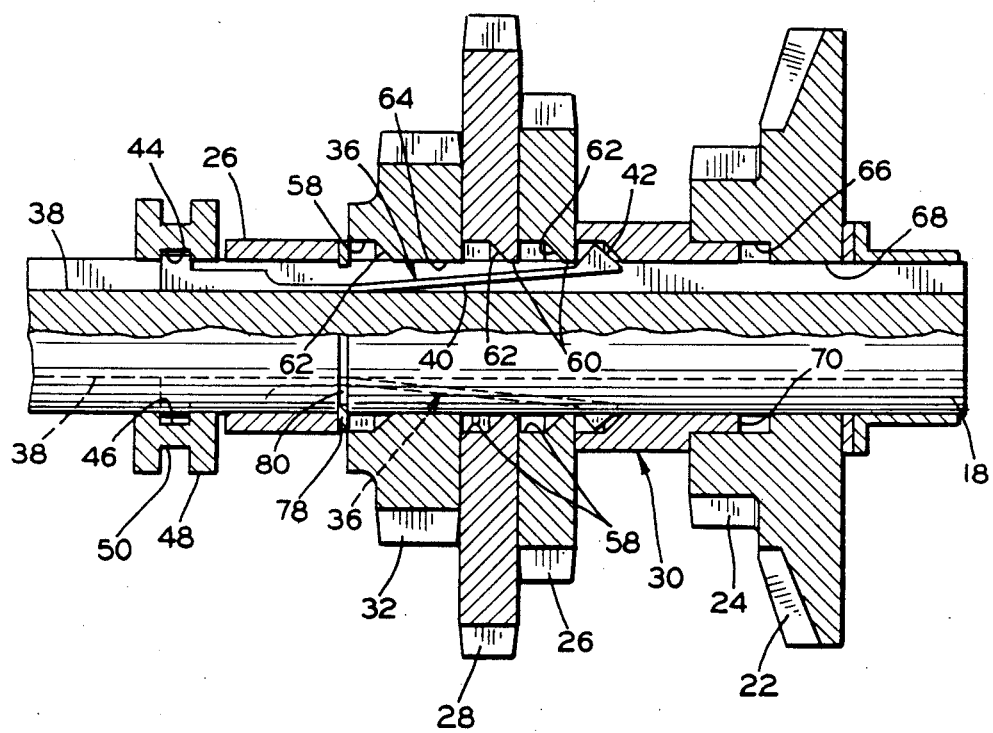
FIG. 2 is an enlarged, fragmentary view in section of certain gears and shift mechanism of the transaxle of FIG. 1.
Figure 3:
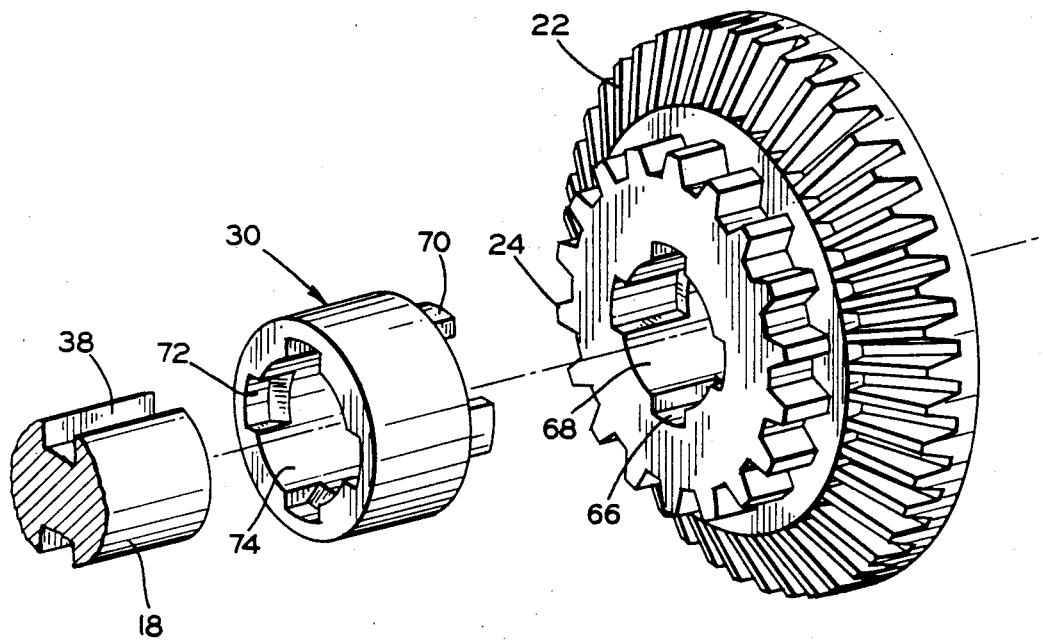
FIG. 3 is an exploded view in perspective of certain gears and a shift coupling shown in FIG. 2.

The shift keys 36 can be identical to those in the five speed transaxle of the aforementioned patent application. These are relatively expensive components and identical ones save significant costs. The travel of the shift keys 36 toward the right, as viewed in FIG. 2, is limited by a spacing collar 76 which is rotatably mounted on the shaft 18 and is positioned adjacent the reverse gear 32, with a split ring 78 therebetween which is located in an annular narrow groove 80 in the shaft 18.

Two second, forward speed gears or toothed members 82 and 84 (FIG. 1) are rotatably supported by the output shaft or axle 20 and mesh, respectively, with the first two forward speed gears 24 and 26. The two gears 82 and 84 are mounted together for non-rotatable movement relative to one another by a wide spur gear or splined shaft 86 which has gear teeth or splines around the periphery and extending throughout its length. The gears 82 and 84 have central bores of similar size and shape to the gear teeth or spines and mesh with the periphery of the splined shaft 86 to lock both of the gears together for simultaneous rotation. The gears 82 and 84 are spaced apart a predetermined distance by a spacing sleeve 88 supported on the spline shaft 86. An intermediate portion of the shaft 86 beyond the gear 84 meshes with the first forward speed gear 28 and an end portion of the splined shaft 86 meshes with an idler gear 90 (FIG. 1) which, in turn, meshes with the first reverse gear 32. The splined shaft 86 thus serves as one of the second forward speed gears by meshing with first forward speed gear 28, serves as a second reverse gear by being connected to the first reverse gear 32 through the idler gear 90, and causes the second forward speed gears 82 and 84 to rotate together, being spaced apart by the spacing sleeve 88.

A drive pinion gear or toothed member 92 is affixed to a splined portion 94 of the first shaft 18 and rotates therewith. The gear 92 meshes with and drives a ring gear 96 of a differential 98 which drives the output shaft or axle 20 and a second axle 100.

In the operation of the transaxle 10, when the lug 42 of the shift key 36 engages the notch 58 of the reverse gear 32, the transaxle is in reverse. The drive is then through the combination gear 22 and the gear 24, the second forward speed gear 82, the splined shaft 86, the idler gear 90, and the reverse gear 32 to the pinion gear 92. When the shift key 36 is moved toward the right and the lug 42 is under the reverse gear bore 64, the transaxle is in neutral with not gear being engaged with the shaft 18. When the shift key 36 is moved further toward the right, and the lug 42 engages the notch 60 in the first forward speed gear 28, the transaxle 10 is in first gear or a first forward speed. The drive is then through the combination gear 22 and the gear 24, the second forward speed gear 82, the splined shaft 86, and the first forward speed gear 28 to the pinion gear 92. When the shift key 36 is moved further to the right and the lug 42 is in the recess 58 of the first forward speed gear 26, the transaxle is in second gear or a second forward speed. The drive is then through the gears 24 and 82, and the gears 84 and 26 to the pinion gear 92. Finally, when the shift key 36 is moved to its extreme right position, the lug 42 is in the recess 72 of the shift coupling 30 and the transaxle is in third gear or a third forward speed condition. The drive in then through the combination gear 22, the coupling 30, and the shift key 36 directly to the drive pinion gear 92.

It will be seen from the above, that the shift coupling 30 enables equalized incremental shift distances for the shift mechanism from revere through third gear or the third forward speed. Further, most of the internal components of the transaxle, as well as the housing, can be identical to those used in a five speed transaxle or other transaxle having fewer or more forward speed conditions. Different second gears or second forward speeds for the transaxle can also be relatively easily changed to meet EOM customer requirements simply by changing the gears 26 and 84.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. A gear drive unit comprising a shaft, a shift key mounted on said shaft for longitudinal movement with respect to said shaft, a first gear rotatably mounted on said shaft, a second gear rotatably mounted on said shaft and spaced from said first gear, said second gear having means for receiving said shift key to enable said second gear to rotate with said shaft, a shift coupling on said shaft and extending from said first gear toward said second gear and rotatable with said first gear, said coupling having means for receiving said shift key to enable said coupling and said first gear to rotate with said shaft, said coupling being separate from said first gear, said first gear and said coupling having engaging means to enable said coupling to rotate with said first gear.

2. A gear drive unit according to claim 1 wherein said shift key receiving means of said coupling is located closer to said second gear than said first gear.

3. A gear drive unit according to claim 1 wherein said shift key receiving means is at an end of said shift coupling closer to said first gear than to said second gear.

4. A gear drive unit according to clam 1 wherein said engaging means comprises tangs extending toward said first gear from said shift coupling and notches receiving said tangs in said first gear.

5. In combination, a shaft having a longitudinally-extending groove, a shift key in said groove for longitudinal movement with respect to said shaft, means for moving said shift key longitudinally, a revere gear rotatably mounted on said shaft and having recess means for receiving said shift key, a forward speed gear rotatably mounted on said shaft and having recess means for receiving said shift key, an additional forward speed gear rotatably mounted on said shaft and spaced from said first forward speed gear, a shift coupling rotatably mounted on said shaft and located between said forward speed gears, said shift coupling having mechanical means for engaging said additional forward speed gear whereby said shift coupling and said additional forward speed gear rotate together, said shift coupling having means spaced from said additional forward speed gear for receiving said shift key.

6. The combination according to claim 5 wherein said shift key receiving means is at an end portion of said shift coupling.

7. The combination according to claim 5 wherein a collar is rotatably mounted on said shaft on the side of said reverse gear opposite said first forward speed gear for limiting the extend to which said shift key can move toward said additional forward speed gear.

8. The combination according to claim 5 wherein said mechanical means comprises tangs extending toward said additional forward speed gear from said shift coupling and received in notches in said additional forward speed gear.

9. The combination according to claim 5 wherein means are located on said shaft between the recesses in said reverse gear and the recesses in said first forward speed gear for forming a neutral position for said shift key.

10. The combination according to claim 5 wherein a second forward speed gear is rotatably mounted on said shaft adjacent said first forward speed gear between said first forward speed gear and said shift coupling, said second forward speed gear having recesses for receiving said shift key, said recesses of said first forward speed gear, said second forward speed gear, and said shift coupling being uniformly spaced apart.

11. A gear drive unit comprising a shaft, a shift key mounted on said shaft for longitudinal movement with respect to said shaft, a combination driven bevel gear and first gear rotatably mounted on said shaft, a second gear rotatably mounted on said shaft and spaced from said first gear, said second gear having means for receiving said shift key to enable said second gear to rotate with said shaft, a shift coupling rotatably mounted on said shaft between said first and second gears, said coupling engaging said combination gear to enable said combination gear and said coupling to rotate together, and said coupling having means at an end closer to said second gear for receiving said shift key to enable said coupling and said combination gear to rotate with said shaft.

12. A gear drive unit according to claim 11 wherein said coupling is separate from said first gear, said first gear and said coupling having engaging means to enable said coupling to rotate with said first gear.

13. A gear drive unit according to claim 12 wherein said engaging means comprises tangs extending toward said first gear from said shift coupling and notches receiving said tangs in said first gear.

* * * * *

UNITED STATES PATENT AND TRADEMARK OFFICE
CERTIFICATE OF CORRECTION

PATENT NO. : 4,984,478
DATED : January 15, 1991
INVENTOR(S) : Paul A. Crawford and James E. Hall It is certified that error appears in the above-identified patent and that said Letters Patent is hereby corrected as shown below:

Column 2, line 5, change "object" to --objects--.

Column 3, line 22, change "nd" to --and--.

Column 3, line 47, change "spines" to --splines--.

Column 4, line 9, change "not" to --no--.

Column 4, line 30, change "revere" to --reverse--.

Signed and Sealed this

Fifth Day of May, 1992

Attest:

DOUGLAS B. COMER

*Attesting Officer*  Acting Commissioner of Patents and Trademarks